United States Patent [19]

Richman et al.

[11] Patent Number: 5,675,661
[45] Date of Patent: Oct. 7, 1997

[54] AIRCRAFT DOCKING SYSTEM

[75] Inventors: Dennis C. Richman, Irvine; Daniel C. Lorti, Newport Beach; Bradley D. Ostman, Los Altos; Rolf Krumes, Anaheim; Eden Y. Mei, Brea; Gilberto Di Benedetto, Rancho Palos Verdes, all of Calif.

[73] Assignee: Northrop Grumman Corporation, Los Angeles, Calif.

[21] Appl. No.: 542,240

[22] Filed: Oct. 12, 1995

[51] Int. Cl.⁶ ........................................ G06K 9/62
[52] U.S. Cl. .................. 382/104; 382/216; 382/217; 340/958
[58] Field of Search ........................... 382/103, 104, 382/154, 215, 216, 217; 340/958

[56] References Cited

U.S. PATENT DOCUMENTS

| | | | |
|---|---|---|---|
| 4,184,655 | 1/1980 | Anderberg | 244/114 R |
| 4,249,159 | 2/1981 | Stasko | 340/26 |
| 4,856,896 | 8/1989 | Farr | 340/958 |
| 4,924,507 | 5/1990 | Chao et al. | 382/31 |
| 4,994,681 | 2/1991 | Mann | 340/958 |
| 5,109,345 | 4/1992 | Dabney et al. | 364/459 |
| 5,142,658 | 8/1992 | McMorran et al. | 382/104 |
| 5,166,746 | 11/1992 | Sato et al. | 340/958 |
| 5,216,236 | 6/1993 | Blais | 250/203.2 |
| 5,243,553 | 9/1993 | Flockencier | 356/5 |
| 5,267,329 | 11/1993 | Ulich et al. | 382/103 |
| 5,321,772 | 6/1994 | Sawyer | 382/216 |
| 5,323,472 | 6/1994 | Falk | 382/103 |

Primary Examiner—Michael T. Razavi
Assistant Examiner—Jon Chang
Attorney, Agent, or Firm—Terry J. Anderson; Karl J. Hoch, Jr.

[57] ABSTRACT

An aircraft docking system is installed at a point of convenience within the dock in full view of the approaching aircraft and in view of the pilot, and has a display which is readily seen by the pilot through the cockpit windshield as the aircraft proceeds along a taxiway and during a turning of the aircraft from the taxiway into the dock. Operation of the docking system is based on the use of feature extraction templates of three-dimensional images of candidate aircraft for the dock. An image of the approaching aircraft is obtained by use of ranging circuitry of an optical laser radar. By comparing the image with the rotated and scaled model, the image can be interpreted to show the present location and orientation of the approaching aircraft. As the image is updated by the radar, the aircraft travel path, as represented by successive locations and orientations of the aircraft, is determined and is compared with the required travel path for the specific aircraft. Deviations between the two travel paths are noted and result in the generation of corrective display signals, in the manner of arrows by way of example, which are presented to the pilot.

12 Claims, 5 Drawing Sheets

AIRCRAFT DOCKING SYSTEM

BACKGROUND OF THE INVENTION

This invention relates to the guiding of an aircraft from a taxiway into a dock and, more particularly, to a system which automatically views an arriving aircraft and the dock area to detect the aircraft and any obstacles which may be in the travel path of the aircraft, matches stored models of the aircraft with the aircraft to determine orientation of the aircraft and a tracking point of the aircraft such as the nose wheel, and displays instructions to a pilot of the aircraft for guiding the aircraft along the desired travel path into the dock.

A common occurrence in airports is the taxiing of an aircraft along a taxiway and into a dock wherein an articulated and telescoping bridge extends from a passenger corridor to a door of the aircraft to provide facile entry and egress of passengers to and from the aircraft. While both small and large aircraft may use the docking facilities, the passenger bridge is used primarily for the larger aircraft. Frequently, the space in the dock available for the larger aircraft is restricted, such that there is not much additional space available for turning maneuvers, for avoidance of nearby aircraft and service vehicles, and for positioning the aircraft at a designated location for connection with the passenger bridge. A dock may be provided with a curved guide line painted on the tarmac to serve as a guide which is followed by the pilot in steering the aircraft into the dock such that the nose wheel of the aircraft follows along the guide line. A stop point is also painted on the guide line to designate the location of the nose wheel for bringing the aircraft to a stop. Frequently, one or more of the ground crew may be employed to aid the pilot in the guiding of the aircraft into the dock, one of these standing ahead of the aircraft in view of the pilot and providing hand signals, including the waving of lamps at night, to direct the pilot for steering the aircraft and for stopping the aircraft at the designated stopping point.

The restricted area of the dock, particularly for the larger aircraft, in conjunction with the need for precise positioning of the aircraft presents a problem for the pilot in guiding the aircraft into the dock. Various attempts to alleviate the problem have been attempted, including the use of mirrors to aid the pilot in viewing the guide line, and the aforementioned use of the ground crew to aid the pilot. Other possible solutions to the problem would be objectionable as being overly complex in terms of electrical and/or mechanical components, and might present difficulties with integration with existing cockpit electronics and communications for providing guidance information directly in the cockpit.

SUMMARY OF THE INVENTION

The aforementioned problems are overcome and other advantages are provided by an aircraft docking system which, in accordance with the invention, is fully self contained so as to avoid any integration with existing cockpit electronics and communications, may be installed at a point of convenience within the dock in full view of the approaching aircraft and in view of the pilot, and has a large and simple display which is readily observed by the pilot through the cockpit windshield as the aircraft proceeds along the taxiway and during the turning of an aircraft from the taxiway into the dock.

Operation of the docking system is based on the use of templates of three-dimensional images of candidate aircraft for the dock, and the selection of one of the templates as a model which can be rotated and scaled by a computer, in the manner of a computed aided design (CAD) procedure. An image of the approaching aircraft is obtained by use of the ranging circuitry of a laser radar (ladar). By comparing the image with the rotated and scaled model, the image can be interpreted to show the present location and orientation of the approaching aircraft. As the image is updated by the ladar, the aircraft travel path, as represented by successive locations and orientations of the aircraft, is determined and is compared with the required travel path for the specific aircraft. Deviations between the two travel paths are noted and result in the generation of corrective display signals, in the manner of arrows by way of example, which are presented to the pilot. The slow-down of the aircraft to the designated stopping point is also displayed. During the initial stages of the approach, the library of templates is correlated against the aircraft image to identify the aircraft for selection of the template to serve as the model. Also, the radar with its scanner is used to locate and to signal the presence of obstacles within a region bordering the required travel path. Thereby, the pilot is able to guide the aircraft expeditiously and safely into the dock for engagement of one or more passenger bridges with one or more doors of the aircraft.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures.

DETAILED DESCRIPTION

Figure 1:
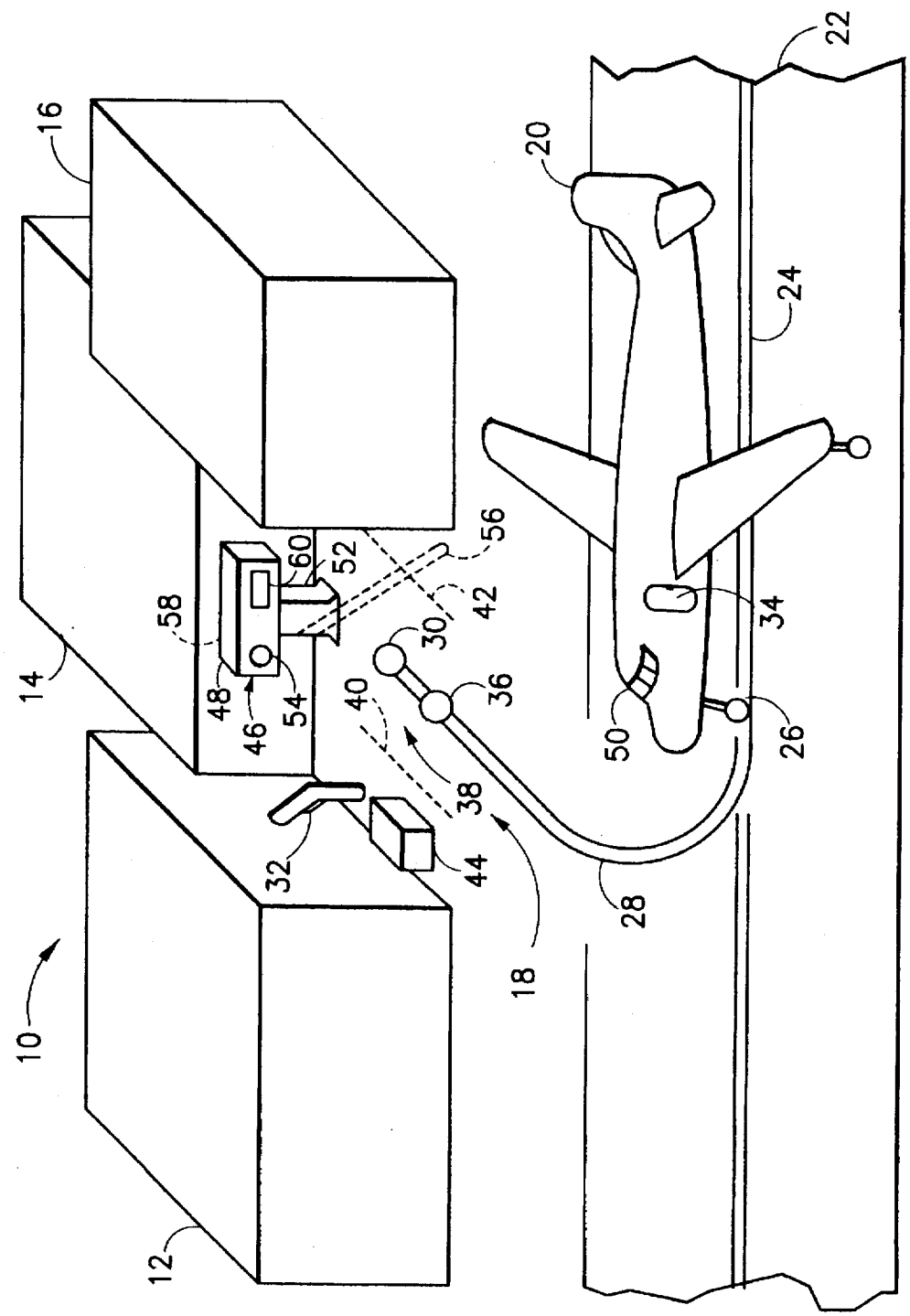
FIG. 1 shows a stylized view of an aircraft taxiing to a dock in an airport, the dock being provided with an aircraft docking system constructed in accordance with the invention.

FIG. 1 shows a fragmentary view of an airport 10 wherein a set of three buildings 12, 14, and 16 are shown, by way of example, partially enclosing a dock 18 for an aircraft 20 approaching the dock 18 along a taxiway 22. The longitudinal direction of the taxiway 22 is oriented perpendicularly to the longitudinal direction of the dock 18. A guideline 24 is provided in the taxiway 22 for a nose wheel 26 of the landing gear of the aircraft 20. During the taxiing, a pilot of the aircraft 20 steers the aircraft 20 so as to keep the nose wheel 26 on the guideline, and thereby facilitate a safe approach to the area of the dock 18. For safe guidance of the aircraft 20 into the dock 18, a further guideline 28 extends from the taxiway guideline 24 by an arcuate path into the dock 18 to a stop point 30 at a terminus of the guideline 28. The stop point 30 marks the location of the nose wheel 26 upon a completion of the docking process for the aircraft 20, thereby to insure that a passenger bridge 32 can be placed conveniently in registration with a door 34 of the aircraft 20 for ingress and exit of passengers to the aircraft 20. Additional stop points, as may be illustrated by a stop point 36, may be provided for guidance of aircraft (not shown) having dimensions different from the aircraft 20. A central region 38 of the dock 18 which is reserved exclusively for use of the aircraft 20 is bounded by two dashed lines 40 and 42. Aircraft servicing apparatus 44 is to be kept outside the central region 38, such as beyond the line 40, by way of example. If the servicing apparatus 44 were left inadvertently in the central region 38 of the dock 18, the servicing apparatus would constitute an obstacle to the approaching aircraft 20, and would be a hazard if unnoticed by the pilot of the aircraft 20.

In accordance with the invention, an aircraft docking system 46 provides guidance information to the pilot in terms of steering and speed commands, and warns the pilot of an obstacle. The system 46 is contained fully within a housing 48 located at a point of convenience for viewing the dock 18 and to be seen through the cockpit window 50 by the pilot as the aircraft 20 advances along the taxiway 22 prior to turning into the dock 18. One such suitable location for the system 46 is at the inner end of the dock 18, beyond the terminus of the guideline 28, as shown in the drawing. If desired, the system 46 with its housing 48 may be mounted upon a pedestal 52. Included within the system 46 is a laser radar 54 which scans the area of the dock 18 in both elevation and in azimuth with a beam 56, such as a pencil beam of infrared radiation, to obtain an image of any aircraft or obstacle which may be present within the dock 18. Also included within the system 46 are electronics 58, located within the housing 48, for processing image data of the radar 54, and a display 60 which presents instructions to the pilot. In particular, it is noted that, within the limited space of the dock 18, it is difficult or impossible for the pilot to view the guideline 28, and the structure of the aircraft 20 prevents the pilot from seeing the position of the nose wheel 26 relative to the guideline 28. Thus, the pilot requires aid in the docking of the aircraft 20, which aid can be provide either by ground crew personnel or, preferably, by the aircraft docking system 46 of the invention.

Figure 2:
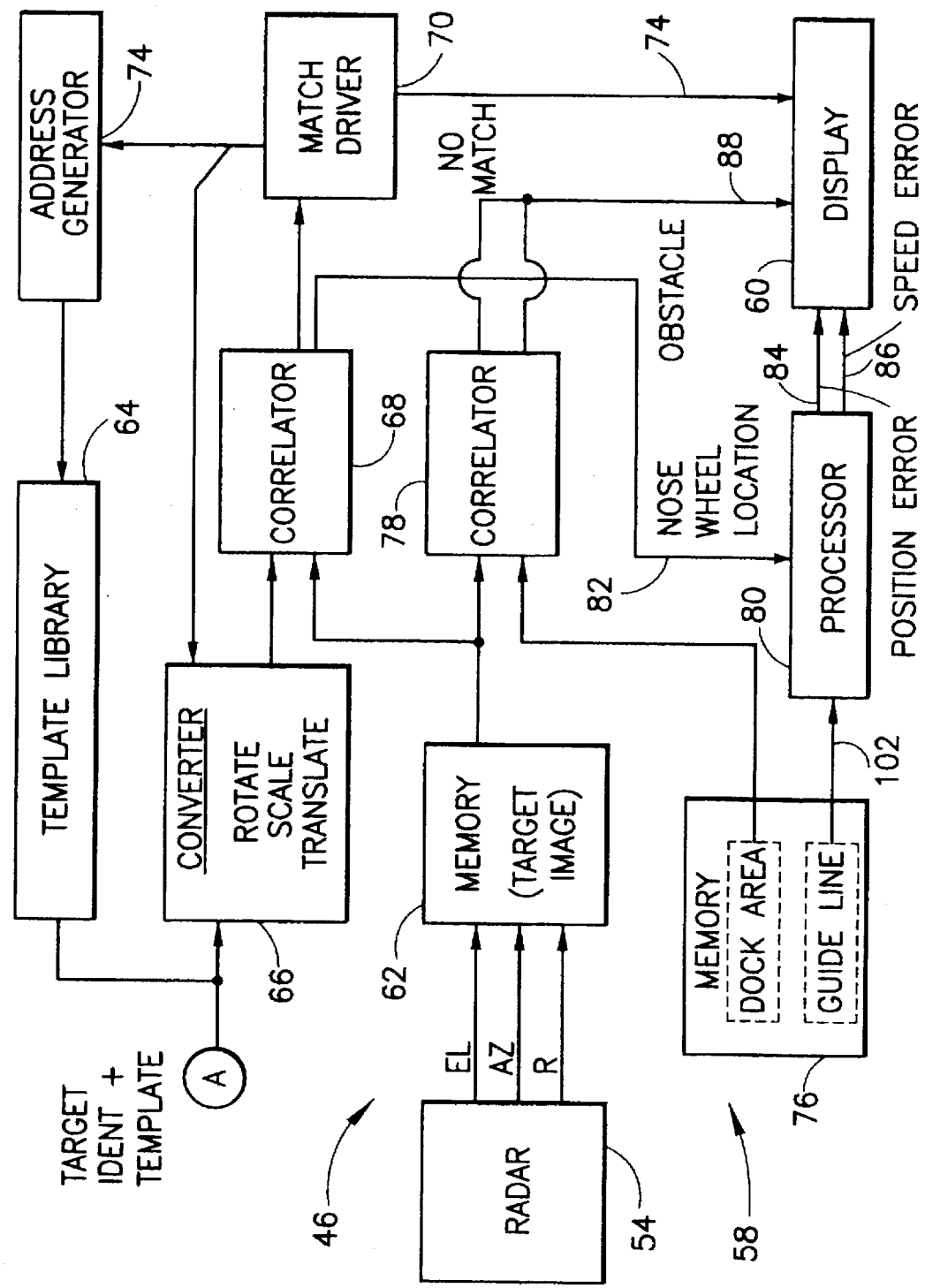
FIG. 2 is a block diagram of the docking system of FIG. 1.

FIG. 2 shows the aircraft docking system 46 including details of the electronics 58. The ladar 54 outputs target data in the form of elevation (EL), azimuth (AZ) and range (R) data for each point of a target, such as an aircraft or an obstacle, which reflects light from the beam 56 (FIG. 1) back to the radar 54. The target data is stored in a memory 62. The collection of target data points stored in the memory 62 constitute a three-dimensional image of the target. In order to interpret the target data to determine what aircraft might be present, the electronics 58 comprises a memory 64 which stores a library of aircraft templates, and a coordinate converter 66 which converts the view of a selected one of the templates by rotation and/or scaling and/or translating the template so as to match, as closely as possible, the target image stored in the memory 62. Each of the templates is a three-dimensional representation of a candidate aircraft for which the system 46 is to provide guidance. A correlator 68 compares the template outputted by the converter 66 with the target image outputted by the memory 62 to determine the quality of the match between the template and the image.

The preferred embodiment uses feature extraction from ladar data. Comparison to stored features is comparable to writing here, but 3-D CAD comparison is not valid since there would not be any displayable data that would look like an airplane. Features such as nose wheel and wing wheel intrawheel distances and height and size of wings, fuselage and rudder would be used to determine type of aircraft.

A match driver 70 is responsive to the signals outputted by the correlator 68 for driving the converter 66 to provide more rotation about one or more axes of rotation, such as yaw, roll and pitch, and to introduce a scaling and a translation as may be required to match the template to the image. In the event that a suitable match cannot be obtained by the present template, the driver 70 directs an address generator 72 to address the memory 64 to output the next in a series of possible templates for matching to the radar image. The matching procedure continues in this fashion, if necessary, until all templates have been employed. In the event that no suitable match is obtainable, the system 46 notifies the pilot that no guidance is available by transmittance of a no-match signal via line 74 from the driver 70 to the display 60.

The use of three-dimensional templates, including the rotation and scaling of the templates for viewing the templates at different angles of view and at different distances, is well know in the field of computer aided design (CAD) wherein numerous application programs are available for computers to provide the foregoing functions of the converter 66 upon the templates. The functions of the converter 66, the correlator 68 and the driver 70 are shown by separate blocks in FIG. 2 to simplify explanation of the invention. However, if desired, the circuits of the converter 66, the correlator 68 and the driver 70 may be implemented by use of a suitably programmed computer (not shown).

The electronics 58 further comprises a memory 76, a correlator 78, and a signal processor 80. The memory 76 stores data describing the dock area (FIG. 1), in particular, the central region 38 which is to be clear of obstacles. The guideline 28 is also stored as a set of template points within the memory 76. In the aircraft templates stored in the memory 64, the nose wheel of each template is specifically identified. This enables the correlator 68 to identify the location of the nose wheel in a target image, and to output the nose-wheel location via line 82 to the processor 80. Guideline data is also applied by the memory 76 to the processor 80. This enables the processor 80 to determine location of the nose wheel relative to the guideline 28, this being a position error on line 84 as will be described hereinafter, and to signal the pilot to steer left or right to keep the nose wheel on or near to the guideline 28. The foregoing data applied to the processor 80 also enables the processor 80 to output a speed guidance signal to the display 60, this being a speed error signal on line 86 as will be described hereinafter, whereby the display is able to signal the pilot to slow down and to stop the aircraft 20. The objective is not to keep the nose wheel on the guideline, but to park the aircraft at the proper location. This would force a totally different method for steering the aircraft.

The complete ladar image, including any aircraft and/or possible obstacle, is applied by the memory 62 to the correlator 78, along with the dock-area data which is applied by the memory 76 to the correlator 78. This enable the correlator 78 to compare the image data with the dock-area data to determine if an obstacle is present. In the event that the radar image shows an object in a region of the dock 18 which is to be clear, the correlator 78 outputs a signal via line 88 to the display 60 indicating the presence of an obstacle.

In response to the obstaclesignal on line 88, the display 60 presents an obstacle warning signal to the pilot who can then take remedial action, such as by stopping the aircraft 20 until the obstacle is removed. To permit rapid and facile reading of a message on the display 60, the display 60 may employ an arrow to represent a turn command. Other symbols and or words, steady or blinking, may be employed to indicate a final stop, an obstacle, or distance to travel to the stop.

Figure 3:
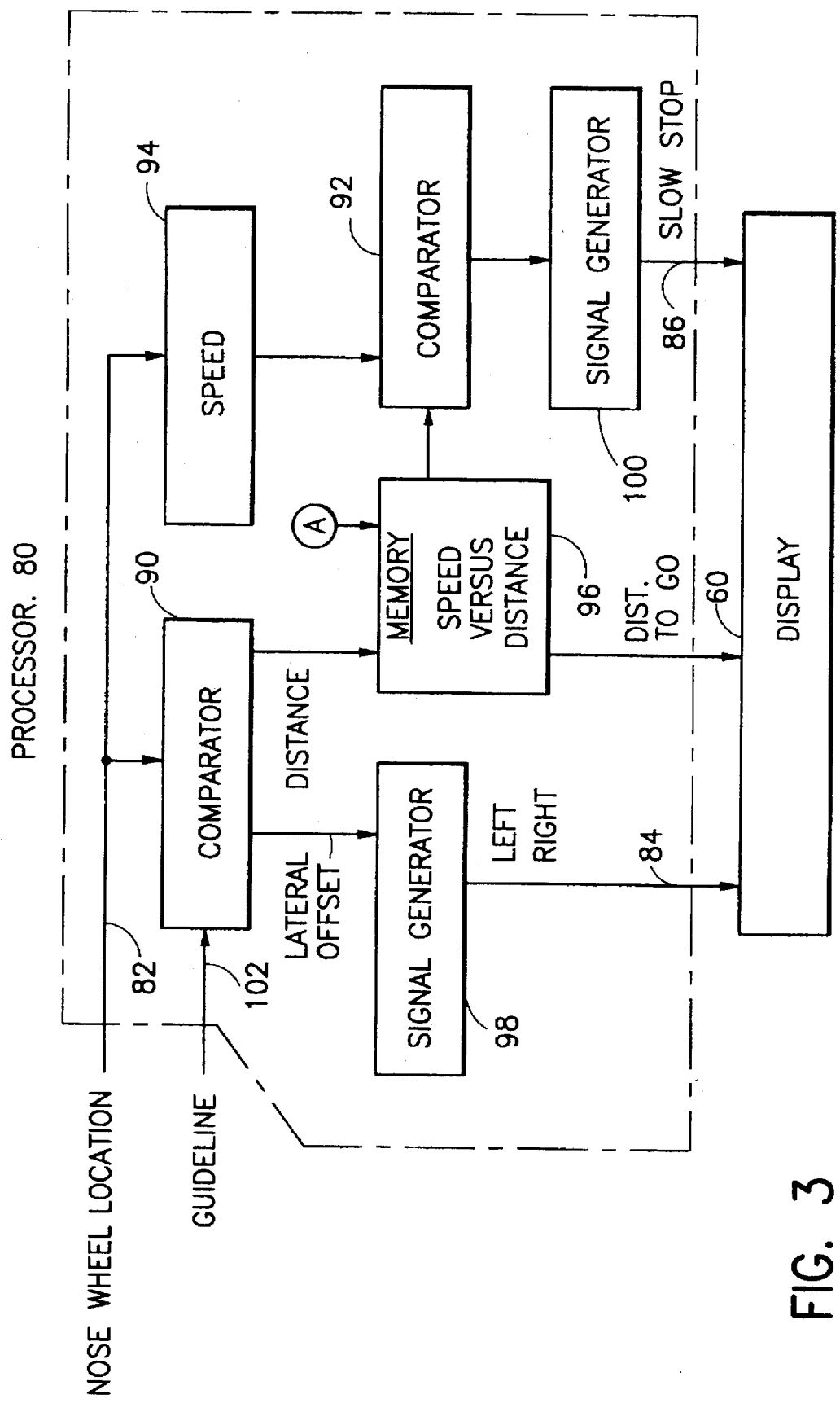
FIG. 3 is a block diagram of a signal processor of the system of FIG. 2.

With reference to FIG. 3, the processor 80 comprises two comparators 90 and 92, a speed unit 94, a memory 96, and two signal generators 98 and 100. In operation, guideline data on line 102 and nose-wheel location on line 82 are applied to the comparator 90 to determine lateral offset of the nose wheel 26 (FIG. 1) from the guideline 28 (FIG. 1), and to determine distance of the nose wheel 26 from the terminus of the guideline 28. The lateral offset is applied by the comparator 90 to the signal generator 98 which generates a signal upon the display 60 directing the pilot to go straight or to turn right or to turn left. The distance from the terminus is applied as an address to the memory 96 along with target identity which is applied as an address from terminal A of the memory 64 (FIG. 2) to terminal A of the memory 96. The memory 96 stores the desired aircraft speed, as a function of location of the nose wheel on the guideline 28 for each type of aircraft, so as to bring the aircraft 20 (FIG. 1) to a stop at the required stop point 30, 36 (FIG. 1). The distance to go to the requisite stop point is outputted by the memory 96 to the display 60 for presentation to the pilot. The speed unit 94 computes the distance increments between successive locations of the nose wheel, and divides a distance increment by the elapsed time of travel to output the actual aircraft speed. The actual speed from the speed unit 94 is compared to the desired speed from the memory 96 by the comparator 92 to determine if the aircraft is moving too fast. The comparator 92 drives the signal generator 100 to output the signal on line 86 for presentation on the display 60 directing the pilot to continue at the present speed, or to slow down, or to stop.

By way of alternative embodiments of the processor 80, if desired, additional signal smoothing circuitry may be included in the comparator 90 and in the speed unit 94 to counteract the effect of any electrical noise which may be present. By way of example, in the comparator 90, an integrator or averaging filter (not shown) may be employed to output an offset signal and a distance signal which are based on an average value of the nose wheel locations measured during an averaging time of one-half second or one second. By way of further example, the speed unit 94 may store a history of nose wheel locations in the form of a graph which is applied to electronic circuitry (not shown) for differentiating the graph to obtain a first derivative which is the aircraft speed and a second derivative which is the aircraft acceleration. The ladar 54 (FIG. 2) operates at a sufficiently high scanning rate and data rate to provide an update of aircraft position of at least approximately four updates per second so as to permit a smoothing of data presented on the display 60, thereby to facilitate a viewing of the display 60 by the pilot.

Figure 4:
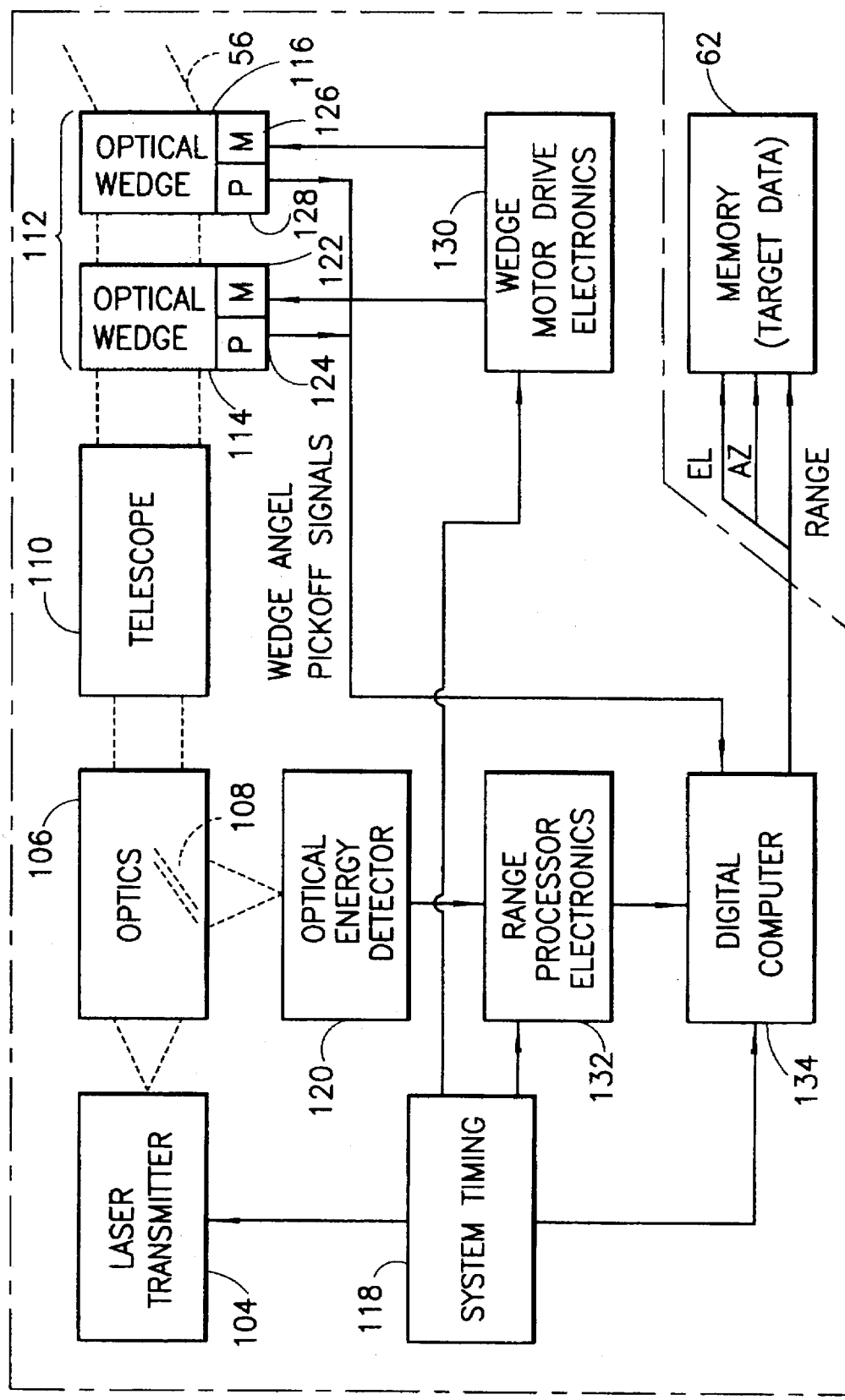
FIG. 4 is a block diagram of a ladar of the system of FIG. 2.

With reference to FIG. 4, the ladar 54 comprises a laser transmitter 104, collimating optics 106 including a beam pick-off 108 such as a half-silvered mirror shown in phantom, a telescope 110, and a scanner 112 including a first optical wedge 114 and a second optical wedge 116 for introducing a two-dimensional scanning pattern to a beam of radiation produced by the telescope 110. In preferred embodiments diffractive optics such as holographic optical elements are used in place of physical wedge. Furthermore, the telescope may be designed off-axis and rotated, thereby eliminating the wedges altogether. The scanned beam is shown at 56 in both FIGS. 1 and 4. The transmitter 104 employs a solid state laser diode operative at a frequency of the electromagnetic spectrum midway between the visible and the infrared (IR) spectra, preferably at a near-IR wavelength of 843 nanometers, and outputting approximately 180 watts of power. Other portions of the electromagnetic spectrum may be employed consistent with production of a beam 56 which is eye safe, so as to prevent any damage to the pilot of other personnel who may be present in the dock. The transmitter 104 is driven by timing signals produced by a system timing unit 118 which includes a clock (not shown), the timing signals triggering the transmitter to generate pulses of optical energy at a rate in a range of approximately 65,000 to 100,000 pulses per second. Pulse width is in the nanosecond range to provide range resolution of approximately one foot. Radiation outputted by the transmitter 104 is collimated by the optics 106 and focussed by the telescope 110 to provide the beam 56. Energy reflected by the aircraft or other object in the dock area appears as a target echo, and is directed by the scanner back through the telescope 110 to the optics 106 wherein the pick-off 108 directs the target echo to a detector 120 of optical energy. By way of example, the detector 120 may employ a silicon avalanche photodiode for conversion of the optical energy to electrical energy.

The first optical wedge 114 is rotated about an optical axis of the telescope 110 by a motor 122 to deflect the beam 56 in azimuth, the amount of rotation being detected by an angle encoder (or pick-off) 124 which generates pulses designating the rotational position of the optical wedge 114. Similarly, the second optical wedge 116 is rotated about the optical axis of the telescope 110 by a motor 126 to deflect the beam 56 is elevation, the amount of rotation being detected by an angle encoder 128. The motors 122 and 126 are activated by drive electronics 130. Also included in the ladar 54 is a range processor 132 and a computer 134. Operations of the range processor 132, the computer 134 and the wedge driver electronics 130 are synchronized with the operation of the transmitter 104 by timing signals of the timing unit 118.

The timing unit 118 provides the range processor 132 with a timing signal designating the instant of transmission of a radar pulse from the transmitter 104. Reception of an echo resulting from the transmission is reported to the range processor 132 by an echo signal outputted by the detector 120 upon receipt of the reflected optical signal by the detector 120. The time elapsed between the transmission of the ladar signal to reception of an echo is interpreted by the range processor 132 as the range of the reflecting surface of a target which gave rise to the echo. Plural reflections or echoes resulting from a single radar pulse represent plural reflecting surfaces such as surfaces of the main wing and the tail of an aircraft. The ranges of these reflecting surface elements are applied by the range processor 132 to the computer 134. The wedge angle signals produced by the encoders 124 and 128 provide the azimuthal and elevational coordinates of the set of echoes resulting from a single transmission of a pulse by the transmitter 104. The wedge angle signals are applied by the encoders 124 and 128 to the computer 134. Thereby, the computer has a three-dimensional spatial address of each of the foregoing surface reflecting elements in terms of range, azimuth and elevation. The optical wedges 114 and 116 direct the next transmitted pulse of the transmitter 104 in a slightly different direction of the scanning pattern due to the rotation of the wedges 114 and 116 by the motors 122 and 126. Echoes resulting from the next radar pulse describe further surface reflecting elements which are logged into the computer in terms of the three-dimensional spatial address. These surface elements collectively constitute an image of the target which may be an aircraft or obstacle or both. This target data is outputted by the radar 54 to the memory 62 to provide an image of the target.

Figure 5:
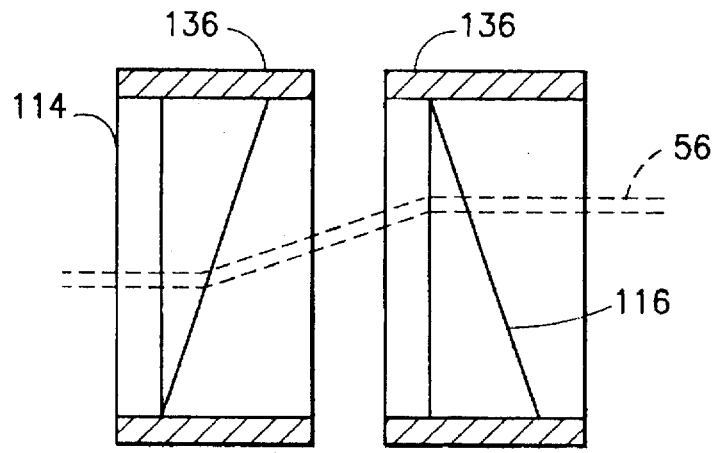
FIG. 5 is a sectional view of an optical scanner of the radar of FIG. 4, the scanner having rotating wedges.
Figure 6:
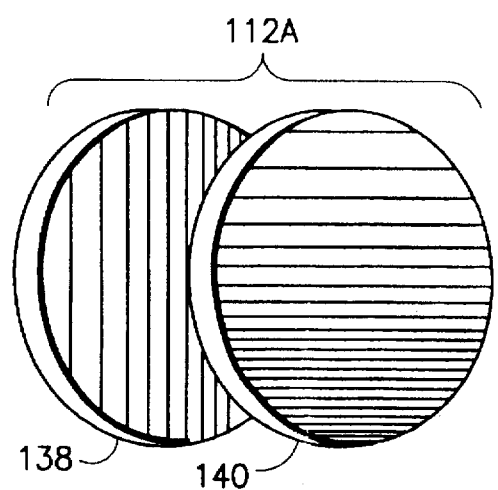
FIG. 6 is a perspective view of two holographic optical elements in an alternative embodiment of the scanner of the radar of FIG. 4, rulings of the optical elements being shown oriented at ninety degrees by way of example for deflecting a beam in both horizontal and vertical directions.

FIG. 5 shows a sectional view of the scanner 112 for one possible orientation of the wedges 114 and 116 relative to each other. Each wedge 114, 116 is constructed of an optically transmissive material, such as glass, and is supported within an encircling rim 136. The rims 136 engage with the respective motors 122, 126 and encoders 124, 128 of FIG. 4 for steering the beam 56 and for reporting the orientation of the beam 56. By way of alternative embodiment of the scanner 112 of FIG. 4, FIG. 6 shows a scanner 112A which employs holographic optical elements 138 and 140 in place of the wedges 114 and 116 of FIG. 5. Each of the elements 138 and 140 is constructed of an optically transmissive material, and is provided with a set of grooves and interleaved ridges in the manner of a fragment of a Fresnel zone plate, wherein the spacings of the grooves and the ridges varies in a well-known manner. Each of the elements 138 and 140 is operative to deflect a path of radiation propagating through the respective element 138, 140. The element 138 may be placed within the first of the rims 136 of FIG. 5 in substitution for the wedge 114, and the element 140 may be place in the second of the rims 136 in substitution for the wedge 116. By way of example, the wedges 114 and 116 are depicted in FIG. 5 in rotational relationship of 180 degrees for transmittal of the beam 56 in a direction parallel to the axis of the telescope 110 (FIG. 4) while the holographic optical elements 138 and 140 are depicted with a relative rotation of 90 degrees for equal angles of elevation and of azimuth.

Figure 7:
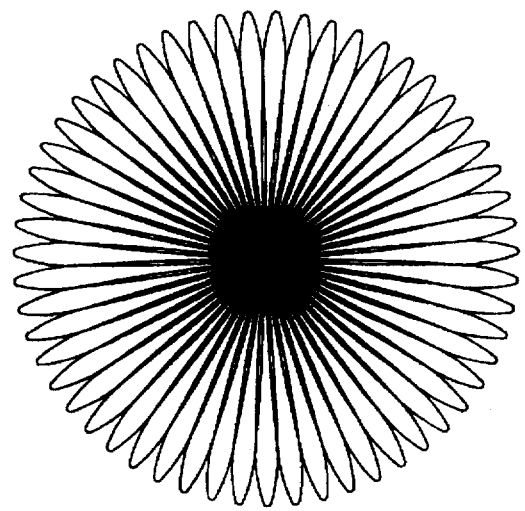
FIG. 7 is a scan pattern of a beam obtained by rotation of the wedges or optical elements of the scanner at different rotational rates.

By way of example in the construction of the scanner 112, the wedge angle may be 25 degrees for each of the wedges 114 and 116. The resultant diameter of the scan pattern, shown in FIG. 7, is 175 meters at a distance of 100 meters. If one of the optical wedges is rotated at 1500 revolutions per minute (rpm), and the second of the wedges is rotated at 1740.642 rpm, the scan pattern of FIG. 7 is produced within one second of scanning, with further interleaving of successive scanning paths upon subsequent rotations of the wedges 114 and 116. The scanning pattern of FIG. 7 is shown by way of example, and other forms of scan may be employed, such as the use or a raster scan obtained by suitable rotation of the optical wedges.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An aircraft ducking system comprising:
    imaging means for viewing the area of a dock and an aircraft approaching the dock, the imaging means providing images and locations of the aircraft and of obstacles in the dock area;
    template means for providing templates of a plurality of aircraft, said template means including means for rotating and for scaling any one of said templates;
    means for correlating an aircraft image of said imaging means to a plurality of templates of said template means to select one of said templates to serve as a model and identity of the aircraft, said correlating means outputting orientation of the aircraft;
    means responsive to said aircraft image and to said model for locating a designated part of the aircraft;
    means for comparing a location of said designated part of the aircraft relative to a predetermined travel path into the dock;
    means for signaling a pilot of the aircraft with guidance data for piloting the aircraft along the travel path into the dock; and
    means coupled to said imaging means for identifying the presence of one of said obstacles in said dock area, and wherein said signaling means signals the presence of said one obstacle in said dock area.

2. A system according to claim 1 wherein said imaging means comprises an optical laser radar having an optical scanner ranging means for providing a three-dimensional representation of the aircraft in said aircraft image, and wherein said representation is a three-dimensional model.

3. A system according to claim 1 wherein said designated part of the aircraft is a part of the landing gear.

4. A system according to claim 3 wherein said designated part is the nose wheel of the aircraft.

5. A system according to claim 1 wherein said signaling means comprises a display located in view of the pilot upon an approach of the aircraft to the dock, said display presenting an instruction to the pilot.

6. A system according to claim 5 wherein said instruction comprises a display of an arrow.

7. A system according to claim 5 further comprising a housing, said imaging means, said template means, said correlating means and said display being located within said housing.

8. An aircraft docking system comprising:
    means for providing a three-dimensional model of an aircraft approaching a dock via a taxiway, a centerline of the taxiway being perpendicular to a centerline of the dock;
    means for sighting the aircraft during travel of the aircraft along the taxiway, and during an approaching of the aircraft to the dock, including a turning of the aircraft from the taxiway into the dock, said sighting means providing an image of the aircraft during said travel of the aircraft along the taxiway, and during the approaching of the aircraft to the dock, including said turning of the aircraft from the taxiway into the dock;
    data processing means for correlating data of the image during said travel along the taxiway and during said approaching with data of the model, by rotation of the model, to determine location and orientation of the aircraft relative to the centerlines of the taxiway and the dock; and
    means for generating instructions for correction of said aircraft location and orientation.

9. A system according to claim 8 wherein said instruction generating means includes means for displaying the instruction to a pilot of the aircraft from a position outside the aircraft.

10. A system according to claim 9 wherein said model providing means includes means for rotating and for scaling a model of the aircraft, said model data including data of a rotated and of a scaled model of the aircraft.

11. A system according to claim 10 wherein, in said model providing means, said model is selected as a best fit to an image of the aircraft selected from a plurality of aircraft templates.

12. An aircraft docking system comprising:
    imaging means for viewing the area of a dock and an aircraft approaching the dock via a taxiway having a centerline perpendicular to a centerline of the dock, the imaging means providing images and locations of the aircraft and of obstacles in the dock area;

template means for providing three dimensional templates of a plurality of aircraft, said template means including means for rotating and for scaling any one of said templates;

means for correlating an aircraft image of said imaging means along said taxiway and in said dock to a plurality of templates of said template means to select one of said templates to serve as a three-dimensional model and identity of the aircraft, said correlating means outputting orientation of the aircraft along a curved path of travel of the aircraft from said taxiway into said dock;

means responsive to said aircraft image and to said model for locating a designated part of the aircraft;

means for comparing a location of said designated part of the aircraft relative to a predetermined travel path into the dock; and means for signaling a pilot of the aircraft with guidance data for piloting the aircraft along the predetermined travel path into the dock.

* * * * *